(12) United States Patent
Hennessy et al.

(10) Patent No.: US 10,666,439 B2
(45) Date of Patent: May 26, 2020

(54) HYBRID SECURITY KEY WITH PHYSICAL AND LOGICAL ATTRIBUTES

(71) Applicant: International Business Machines Corporation, Armonk, NY (US)

(72) Inventors: Shawn D. Hennessy, Lisbon, ME (US); Nevenko Zunic, Hopewell Junction, NY (US); Todd P. Seager, Orem, UT (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 15/829,174

(22) Filed: Dec. 1, 2017

(65) Prior Publication Data

US 2019/0173676 A1     Jun. 6, 2019

(51) Int. Cl.
*H04L 9/32* (2006.01)
*G06K 19/06* (2006.01)
(Continued)

(52) U.S. Cl.
CPC .......... *H04L 9/321* (2013.01); *E05B 19/0058* (2013.01); *E05B 35/001* (2013.01); *E05B 35/14* (2013.01); *E05B 49/002* (2013.01); *G06F 21/44* (2013.01); *G06K 19/048* (2013.01); *G06K 19/067* (2013.01); *G06K 19/06009* (2013.01); *G06K 19/06037* (2013.01);
(Continued)

(58) Field of Classification Search
CPC ... H04L 9/321; H04L 63/0892; H04L 9/0897; H04L 9/3226; H04L 9/3234; H04L 63/0853; H04L 2463/082; G06K 19/06037; G06K 19/06009; G06K 19/048; G06K 19/07; G06K 19/067; G06K 19/08; E05B 35/001; E05B 19/0058; E05B 35/14; E05B 49/002; G06F 21/34; G06F 21/44
See application file for complete search history.

(56) References Cited

U.S. PATENT DOCUMENTS 3,829,833 A * 8/1974 Freeny, Jr. ......... G07C 9/00119
                                                     340/5.26
4,789,859 A    12/1988 Clarkson et al.
(Continued)

FOREIGN PATENT DOCUMENTS

CN         2639461 Y      9/2004
JP         4992283 B2     8/2012
(Continued)

OTHER PUBLICATIONS

Spencer, Leon, "Internet of Things market to hit $7.1 trillion by 2020: IDC", ZD Net, Jun. 5, 2014, 12 pages, <http://www.zdnet.com/article/internet-of-things-market-to-hit-7-1-trillion-by-2020-idc/>.

(Continued)

*Primary Examiner* — Huan V Doan
(74) *Attorney, Agent, or Firm* — Stephanie L. Carusillo

(57) ABSTRACT

In an approach, a hybrid security key comprises at least one physical face on a first side of a key comprising a key groove cut and a barcode coupled to a top surface of the physical face; and at least one logical face on a second side of the key comprising a surface insert overlaying a conductive film, wherein the conductive film includes at least one contact point, at least one conductive trace, and a smart chip.

7 Claims, 10 Drawing Sheets

(51) Int. Cl.
*E05B 35/00* (2006.01)
*E05B 19/00* (2006.01)
*G06K 19/067* (2006.01)
*G06K 19/07* (2006.01)
*G06K 19/08* (2006.01)
*E05B 35/14* (2006.01)
*H04L 9/08* (2006.01)
*E05B 49/00* (2006.01)
*G06K 19/04* (2006.01)
*G06F 21/44* (2013.01)
*H04L 29/06* (2006.01)
*G06F 21/34* (2013.01)

(52) U.S. Cl.
CPC .............. *G06K 19/07* (2013.01); *G06K 19/08* (2013.01); *H04L 9/0897* (2013.01); *H04L 9/3226* (2013.01); *H04L 9/3234* (2013.01); *G06F 21/34* (2013.01); *H04L 63/0892* (2013.01)

(56) References Cited

U.S. PATENT DOCUMENTS

| | | | |
|---|---|---|---|
| 5,337,043 A * | 8/1994 | Gokcebay | G07C 9/00087 235/382.5 |
| 5,586,250 A | 12/1996 | Carbonneau | |
| 5,692,178 A | 11/1997 | Shaughnessy | |
| 6,289,455 B1 * | 9/2001 | Kocher | G06Q 20/367 380/228 |
| 6,442,985 B1 * | 9/2002 | Watanuki | B60R 25/04 70/186 |
| 6,483,424 B1 | 11/2002 | Bianco | |
| 7,272,231 B2 | 9/2007 | Jonas et al. | |
| 7,556,203 B2 | 7/2009 | Robinson et al. | |
| 7,941,934 B2 | 5/2011 | Gemer et al. | |
| 8,581,690 B2 | 11/2013 | Lappalainen et al. | |
| 9,053,313 B2 | 6/2015 | Hart et al. | |
| 9,135,430 B2 | 9/2015 | Callaghan | |
| 9,166,972 B2 | 10/2015 | Maeda et al. | |
| 2004/0051380 A1 * | 3/2004 | Okada | B60R 25/22 307/10.5 |
| 2005/0021705 A1 | 1/2005 | Jurisch | |
| 2009/0212903 A1 * | 8/2009 | Tamezane | E05B 35/007 340/5.2 |
| 2010/0127862 A1 * | 5/2010 | Sato | G07C 9/00896 340/540 |
| 2011/0291798 A1 | 12/2011 | Schibuk | |
| 2012/0011367 A1 * | 1/2012 | Denison | G07C 9/00571 713/170 |
| 2013/0016840 A1 | 1/2013 | Willey et al. | |
| 2014/0108785 A1 | 4/2014 | Lindteigen | |
| 2014/0263638 A1 | 9/2014 | Bolton | |
| 2015/0138716 A1 | 5/2015 | Herman | |
| 2015/0365240 A1 | 12/2015 | Callaghan | |
| 2016/0012653 A1 | 1/2016 | Soroko | |
| 2016/0092488 A1 | 3/2016 | Sun et al. | |
| 2016/0323736 A1 | 11/2016 | Donahue et al. | |
| 2016/0337131 A1 | 11/2016 | de Andrada et al. | |
| 2017/0011208 A1 | 1/2017 | Lynch | |
| 2018/0202201 A1 | 7/2018 | Cencer | |
| 2019/0069436 A1 | 2/2019 | Norton | |

FOREIGN PATENT DOCUMENTS

| | | |
|---|---|---|
| JP | 2016032247 A | 3/2016 |
| JP | 6051972 B2 | 12/2016 |
| WO | 8601360 A1 | 2/1985 |

OTHER PUBLICATIONS

Hennessy et al., "Non-Networked Device Performing Certificate Authority Functions in Support of Remote AAA", U.S. Appl. No. 15/829,257, filed Dec. 1, 2017, 40 pages.

Hennessy et al., "Hybrid Physical and Logical Locking Device and Mechanism", U.S. Appl. No. 15/829,237, filed Dec. 1, 2017 40 pages.

IBM List of Patent Applications Treated as Related, Appendix P, Dated Dec. 6, 2017, 2 pages.

\* cited by examiner

HYBRID SECURITY KEY WITH PHYSICAL AND LOGICAL ATTRIBUTES

BACKGROUND

The present invention relates generally to the field of security keys and more particularly to a hybrid security key with isolated physical and logical attributes for remote Authentication, Authorization, and Auditing (AAA).

Security controls are safeguards or countermeasures to avoid, detect, counteract, or minimize security risks to physical property, information, computer systems, or other assets. A security controls system can have a physical layer, e.g. doors and locks, and a technical layer, e.g. user authentication and logical access controls.

AAA is a term for a framework for intelligently controlling access to computer resources, enforcing policies, auditing usage, and providing the information necessary to bill for services. These combined processes are considered important for effective electronic device management and security.

First, authentication provides a way of identifying a user, typically by having the user enter a valid user name and valid password before access is granted. The process of authentication is based on each user having a unique set of criteria for gaining access. The AAA device compares a user's authentication credentials with other user credentials stored in a database. If the credentials match, the user is granted access to the device. If the credentials are at variance, authentication fails and device access is denied.

Following authentication, a user must gain authorization for doing certain tasks. After logging into a device, for instance, the user may try to issue commands. The authorization process determines whether the user has the authority to issue such commands. Simply put, authorization is the process of enforcing policies: determining what types or qualities of activities, resources, or services a user is permitted. Usually, authorization occurs within the context of authentication. Once you have authenticated a user, they may be authorized for different types of access or activity.

The final plank in the AAA framework is auditing, which measures the resources a user consumes during access. This can include the amount of system time or the amount of data a user has sent and/or received during a session. Auditing is carried out by logging of session statistics and usage information and is used for authorization control, billing, trend analysis, resource utilization, and capacity planning activities.

SUMMARY

Aspects of an embodiment of the present invention disclose a hybrid security key. The hybrid security key comprises at least one physical face on a first side of a key comprising a key groove cut and a barcode coupled to a top surface of the physical face. The hybrid security key also comprises at least one logical face on a second side of the key comprising a surface insert overlaying a conductive film, wherein the conductive film includes at least one contact point, at least one conductive trace, and a smart chip.

DETAILED DESCRIPTION

Figure 1A:
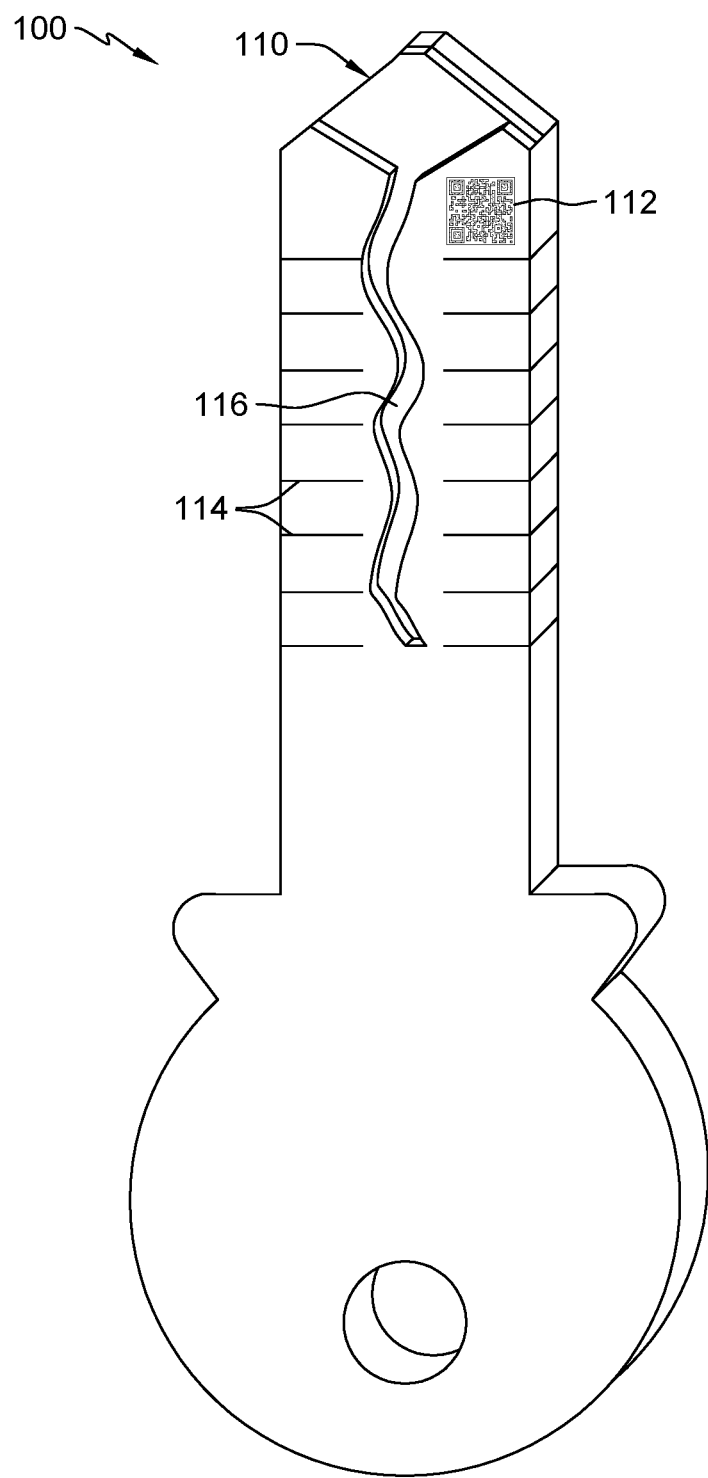
FIG. 1A depicts a side view of a face with physical attributes of a rectangular-shaped hybrid security key, in accordance with an embodiment of the present invention.

Embodiments of the present invention recognize that out of band support for authentication, authorization, and auditing (AAA) is significant in applying security device modification and mitigating communication attack vectors for non-networked distributed devices. Embodiments of the present invention further recognize that there is a lack of ability to support the delivery of AAA to distributed devices outside the band of network or radio frequency (RF) communication.

The problem with securing distributed devices occurs at two layers of concern for AAA—the physical layer and the logical layer. At the physical layer, access to specific distributed devices is generally not controlled beyond the use of a physical security control. The ability to perform effective AAA is limited with the use of a physical key. The management of physical keys requires labor intensive manual procedures to secure key usage, but this does not secure against entities circumventing AAA. At the logical layer, devices that rely upon the normal band of device communication for security services during critical operation stages (e.g. a firmware update) can be compromised via the communication channel that services as the attack vector. If leveraged, this attack vector could impact numerous devices connected through an Internet of Things (TOT) network, a cloud services network, a supervisory control and data acquisition (SCADA) network, and/or a programmable logic controller (PLC) system. The inadequate management of AAA can lead to the unauthorized modification of data resulting in a wide range of ramifications from loss of intellectual property, destruction of critical data, destruction of production assets, and loss of life.

Security controls beyond the physical realm, i.e. in the logical layer, have advanced with their adaptability to threats in the virtualization and consolidation of network operations within a critical infrastructure, such as, a cloud services infrastructure and/or an TOT infrastructure. However, security controls for AAA with out of band operations is a critical gap. More precisely, this security controls gap is focused on the physical layer, in which security controls have largely remained unchanged and rely on systems that are not adaptable to evolving threats. Systems that are not adaptable to evolving threats allow attack vectors to form that can be manipulated by unauthorized third parties. In particular, the management of non-networked devices lacks physical AAA support during sensitive and vulnerable firmware operational cycles, such as a physical upgrade. These attack vectors can cause a loss of Confidentiality, Integrity, and Availability (CIA) of data and services in a device or system. CIA are the three critical attributes or goals of any information security system.

This gap at the physical layer exposes an attack vector that can be leveraged at a subsequent logical security layer. For example, with critical infrastructure that is controlled with SCADA and supporting PLC systems, the general assumption suggests that integration of these types of systems with physical isolation and physical locks is sufficient protection, but these physical security controls are inadequate because of the lack of logical security for devices at the physical layer. The lack of AAA management at the physical layer leads to the loss of CIA of critical data.

Additionally, there are multiple problems with the use of traditional Certificate Authority (CA) for distributed devices in support of AAA. First, in regards to the technical skills required for CA, the security and operation of a networked CA is a significant undertaking that requires extensive defense with security controls, policies, procedures, and ongoing management to appropriately secure against external threats. Second, the management of AAA for physically remote devices requires a secure yet simplified platform for delivery of CA functions that can be operated by a layperson.

Thus, embodiments of the present invention recognize that there is a need for appropriate logical security controls for devices at the physical layer. Some current systems (e.g. car ignition keys) may or may not require a physical presence due to support by RF communication, but this use of a non-physical communication medium introduces another communication channel that exposes an attack vector into the electronic control systems. Currently, no hybrid security key with integrated physical and logical components exists that is completely dependent upon physical contact in securing transition between the physical security layer and the logical security layer.

In this manner, as discussed in greater detail herein, embodiments of the present invention provide the necessary components in an integrated physical device to support the delivery of AAA to physically distributed devices outside the band of network or RF communication. Embodiments of the present invention further provide a multi-faceted hybrid security key that encapsulates physical and logical components to support secure multi-factor AAA through electronic-mechanical operations and physical human-to-machine interaction. Embodiments of the present invention provide a solution for securing systems from communication attack vectors by increasing security through the interlinking of physical operations with logical operations, assuring the hybrid security key's origin through digital signing of a Unique Identification (UID), and removing external attack vectors by having no RF or network communications.

In multiple embodiments, the hybrid security key with isolated physical and logical components enables a secure transition between the physical and logical security layers, logically binds secure credentials within both physical and logical layers, supports credentials for remote authorization of the hybrid security key's origin, supports secured data distribution with remote devices, supports secure remote multi-factor authentication, supports secure remote authorization, supports logging retention of remote key usage for auditing, uses tamper resistant electronic components (e.g., zeroisation of contents to fail safe), and enables multiple facets on key shaft to have physical and logical controls. In multiple embodiments, creation and placement of security credentials onto the hybrid security key occur at the time of manufacture and during the key management lifecycle.

Embodiments of the present invention further recognize that management and CA functions in support of AAA of devices need to function in a remote capacity without networked devices. In this manner, as discussed in greater detail herein, embodiments of the present invention provide a secure stand-alone (i.e., non-networked) CA device that enables support for simplified secure management and use of distributed physical devices (i.e., hybrid security keys and locking devices) in support of AAA. Embodiments of the present invention further provide as the platform for the management of credentials for both hybrid security keys and locking devices during the lifecycle of AAA operations. A self-contained CA device mitigates chances for compromise, eliminates the technical care and feeding required for securing the CA, and provides a simplified management graphical user interface (GUI) to perform CA functions.

In multiple embodiments, the standalone CA device supports random asymmetric key pair generations; random seed import and creation; tamper resistant and/or fail safe security controls; cryptography key pairs to enable secure private key storage, secure export of private key, secure private key import, and public key export; management of XML Advanced Electronic Signatures (XAdES); a touch screen with GUI; a physical barrier (e.g., a shutter door) that restricts access to power supply port; a physical barrier (e.g., a shutter door) that restricts access to universal serial bus (USB) port; restricted access to secure USB port (e.g., only being available during specific operational functions); a keyed slot for programming functions with the hybrid security key; pairing of subsequent external storage devices; differing management operations based upon authorized user's role; remote authentication of hybrid security key's origin; secured data distribution (i.e., reading and writing of data) with authenticated hybrid security keys; secure remote multi-factor authentication of user; secure remote authorization of user through secure embedded repository—Access Control List (ACL); secured operations with biometric factors (e.g., fingerprint, retinal scan, etc.); secure logging retention of operations for auditing; secure logging retention of operations on authenticated hybrid security key(s); on screen review of AAA activities of user; secure export of logging from distributed devices; key operations for management of the secured locking device itself; management of multi-faceted hybrid security keys via swappable key slots; and bonding of CA device component UIDs at point of manufacture.

Embodiments of the present invention provide a physical and electronic locking device that securely encapsulates a physical and logical lock. The lock supports secure multi-factor AAA through various operations (i.e. electro-mechanical, physical hardware circuit modification, and physical human-to-machine interaction). In multiple embodiments, the locking device and associated lock mechanism can be used with a matching hybrid security key that would enable the secure transition from physical layer to logical layer. The physical control surface of the hybrid security key would authorize the physical contact of the logical controls on the hybrid security key within the lock. This contact would enable the secure transition from physical layer to logical layer and direct physical connection between the hybrid security key and the control logic within the locking device.

In multiple embodiments, the physical and electronic locking device enables secure transition and binding of data between the physical and logical security layers, supports differing operations based upon an authorized user's role, supports remote authentication of hybrid security key's origin, supports secured data distribution (i.e., reading and writing) with authenticated hybrid security key, supports secure remote multi-factor authentication of user, supports secure remote authorization of hybrid security key, supports secured operations with biometric factors (e.g., fingerprint, retinal scan, etc.), supports secure logging retention of operations, supports secure logging retention of operations on authenticated hybrid security key(s), supports key operation for management of locking device itself, supports multi-faceted hybrid security keys and alternate axis operations (e.g., counter clockwise v. clockwise rotation around the axis of hybrid security key), supports tamper resistant security controls, supports the retention of key performing unauthenticated or unauthorized operations, and supports hardwire integration with external alarm systems or devices to notify authorities.

Embodiments of the present invention further provide a mechanism for initiating and enabling use of the CA device using a hybrid security key. The CA device is enabled via a key slot where an authorized user can insert a hybrid security key and rotate the hybrid security key to a first detent position. Rotating the hybrid security key to the first detent position opens a shutter door to a power port allowing an external power supply to be connected to the CA device. Now, the CA device can conduct authentication procedures by scanning and validating the inserted hybrid security key's authentication code. Once the hybrid security key has been authenticated, the CA device allows the hybrid security key to be rotated to multiple detent positions of the key slot, in which each detent position enables specific circuitry to complete different management functions and/or operational functions (e.g. opening USB shutter door to allow use of USB port).

The present invention will now be described in detail with reference to the Figures.

In general, hybrid security key 100 consists of a metal keying frame with a bow and at least two-faceted blade with a first side having physical attributes and a second side having logical attributes. In multiple other embodiments not shown, hybrid security key 100 may include additional faces with physical or logical attributes not shown. For example, hybrid security key 100 may be triangular-shaped with two faces with logical attributes similar to logical side 120 and one face with physical attributes similar to physical side 110. In another example, hybrid security key 100 may be square-shaped with two faces with logical attributes similar to logical side 120 and two faces with physical attributes similar to physical side 110. Differing hybrid security keys with differing number of facets may be used to differentiate between roles of multiple authorized users and require different key operations. For example, a two-faceted hybrid security key is used by an authorized user whose role allows for standard operations, while a three-faceted hybrid security key is used by an authorized user whose role requires them to complete firmware updates.

FIG. 1A depicts a side view of a face with physical attributes of a rectangular-shaped hybrid security key with two faces, in accordance with an embodiment of the present invention. FIG. 1A provides only an illustration of one embodiment and does not imply any limitations with regard to environments in which different embodiments may be implemented. In the depicted embodiment, physical side 110 of hybrid security key 100 includes authentication code 112, locking pin locations 114, and key groove cut 116. In an embodiment, authentication code 112 is a physical representation of a key manufacturer's CA signing digital attributes of the key shaft. The digital attributes of the key shaft consist of a digital representation of key groove cut 116 combined with the UID of smart chip 134 (shown in FIG. 1C) and is digitally signed by a private key of the key manufacturer's CA. This enables validation of the hybrid security key's origin during AAA processes via decoding with the key manufacturer's CA public key. In an embodiment, authentication code 112 is coupled to the physical surface of physical side 110 as a barcode (e.g. Quick Response (QR) Code). In an embodiment, locking pin locations 114 represent the locations on hybrid security key 100 that line up with locking pins of a locking device, such as locking pins 313 of locking device 300, in which locking pins 313 fit into a key groove cut of an inserted key, such as key groove cut 116 of hybrid security key 100 (see FIG. 3I for locking pins 313). In an embodiment, key groove cut 116 is a physical groove cut into physical side 110 of hybrid security key 100 that provides a unique physical locking pin sequence. In several embodiments, key groove cut 116 can be cut into hybrid security key 100 by any industry standard.

Figure 1B:
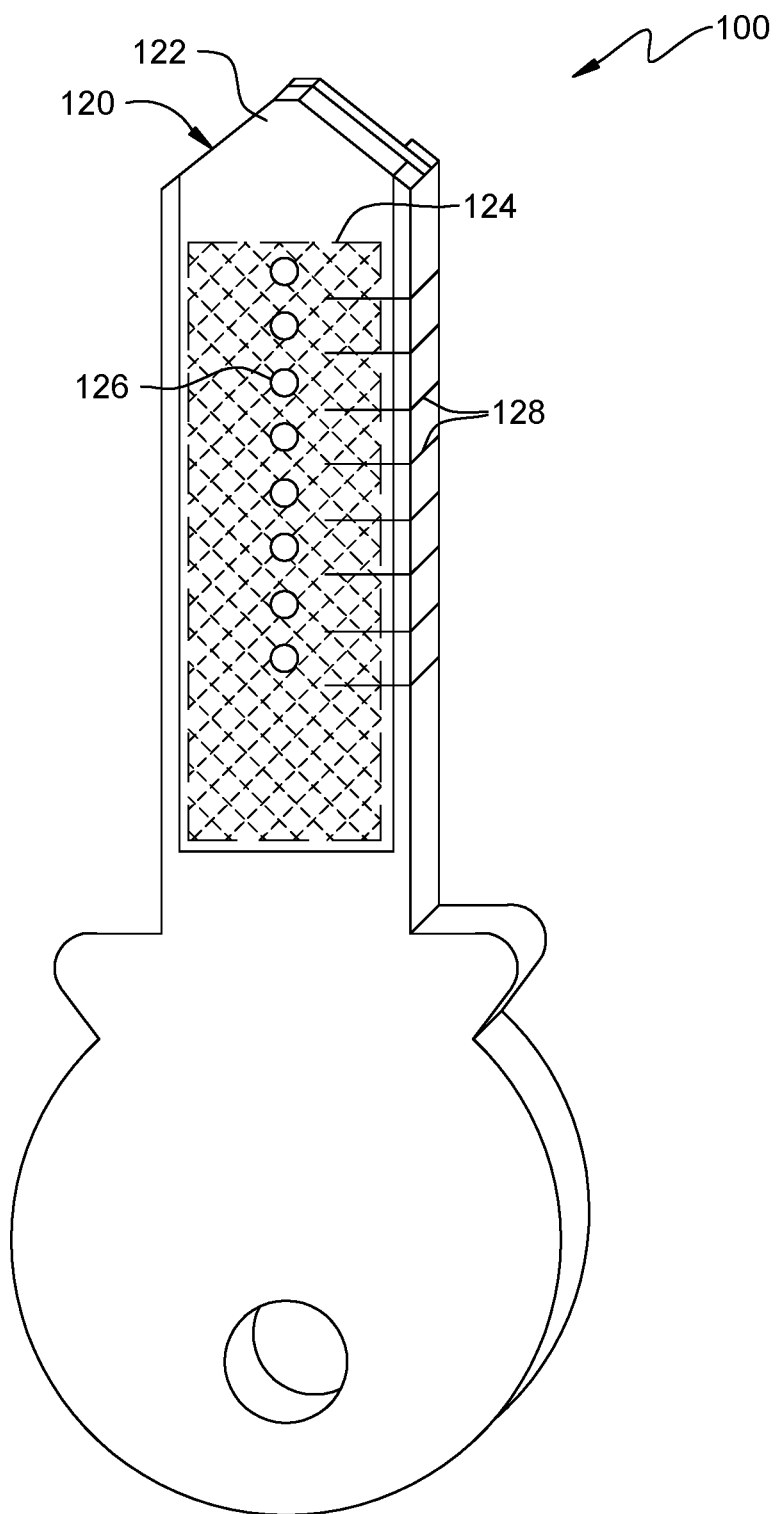
FIG. 1B depicts a side view of a face with logical attributes of a rectangular-shaped hybrid security key, in accordance with an embodiment of the present invention.

FIG. 1B depicts a side view of a face with logical attributes of a rectangular-shaped hybrid security key with two faces, in accordance with an embodiment of the present invention. FIG. 1B provides only an illustration of one embodiment and does not imply any limitations with regard to environments in which different embodiments may be implemented. In the depicted embodiment, logical side 120 of hybrid security key 100 includes surface insert 122 and conductive film 124. In an embodiment, conductive film 124 is coupled to logical side 120 of hybrid security key 100 with surface insert 122 overlaying conductive film 124 (see FIG. 1C below for more details about conductive film 124). In an embodiment, surface insert 122 includes contact points 126 and locking pin locations 128, in which locking pin locations 128 line up with locking pin locations 114 on physical side 110 shown in FIG. 1A. In the depicted embodiment, contact points 126 are circular-shaped holes that line up with underlain conductive pads 130 of conductive film 124. In the depicted embodiment, surface insert 122 includes eight circular-shaped contact points 126 arranged in a line down a central axis of surface insert 122. In other embodiments, surface insert 122 includes a differing number, shape, and arrangement of contact points 126.

Figure 1C:
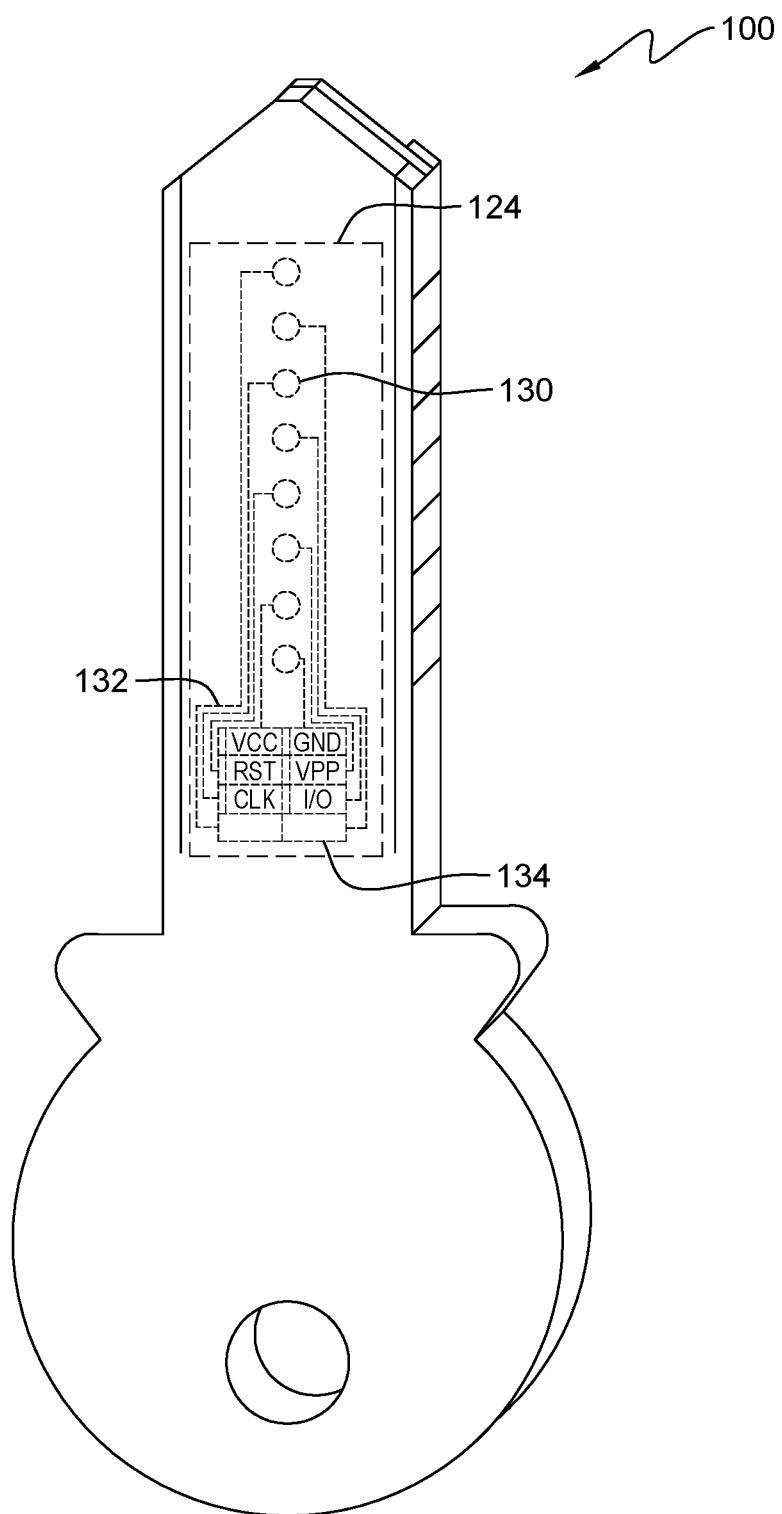
FIG. 1C depicts a side view of the conductive film with a connected smart chip embedded in the hybrid security key of FIG. 1B, in accordance with an embodiment of the present invention.

FIG. 1C depicts the logical circuitry integrated onto a logical side of a hybrid security key including conductive film of FIG. 1B and connected smart chip, in accordance with an embodiment of the present invention. FIG. 1C provides only an illustration of one embodiment and does not imply any limitations with regard to environments in which different embodiments may be implemented. In the depicted embodiment, conductive film 124 includes conductive pads 130 connected to smart chip 134 through conductive traces 132. In the depicted embodiment, conductive film 124 includes eight circular-shaped conductive pads 130 arranged in a line down a central axis of conductive film 124. In other embodiments, conductive film 124 includes a differing number, shape, and arrangement of conductive pads 130. In an embodiment, conductive pads 130 are made of conductive material (e.g. copper). In the depicted embodiment, conductive pads 130 are coupled to the surface of conductive film 124. In the depicted embodiment, conductive pads 130 are connected to conductive traces 132. In an embodiment, conductive traces 132 complete circuitry to connect conductive pads 130 to smart chip 134. In the depicted embodiment, conductive traces 132 are coupled to the surface of conductive film 124. In the depicted embodiment, conductive traces 132 are connected to conductive pads 130 on a first end and connected to smart chip 134 on a second end. In the depicted embodiment, smart chip 134 is coupled to the surface of conductive film 124. In the depicted embodiment, smart chip 134 is connected to conductive traces 132. In an embodiment, smart chip 134 stores a UID for hybrid security key 100.

Figure 2A:
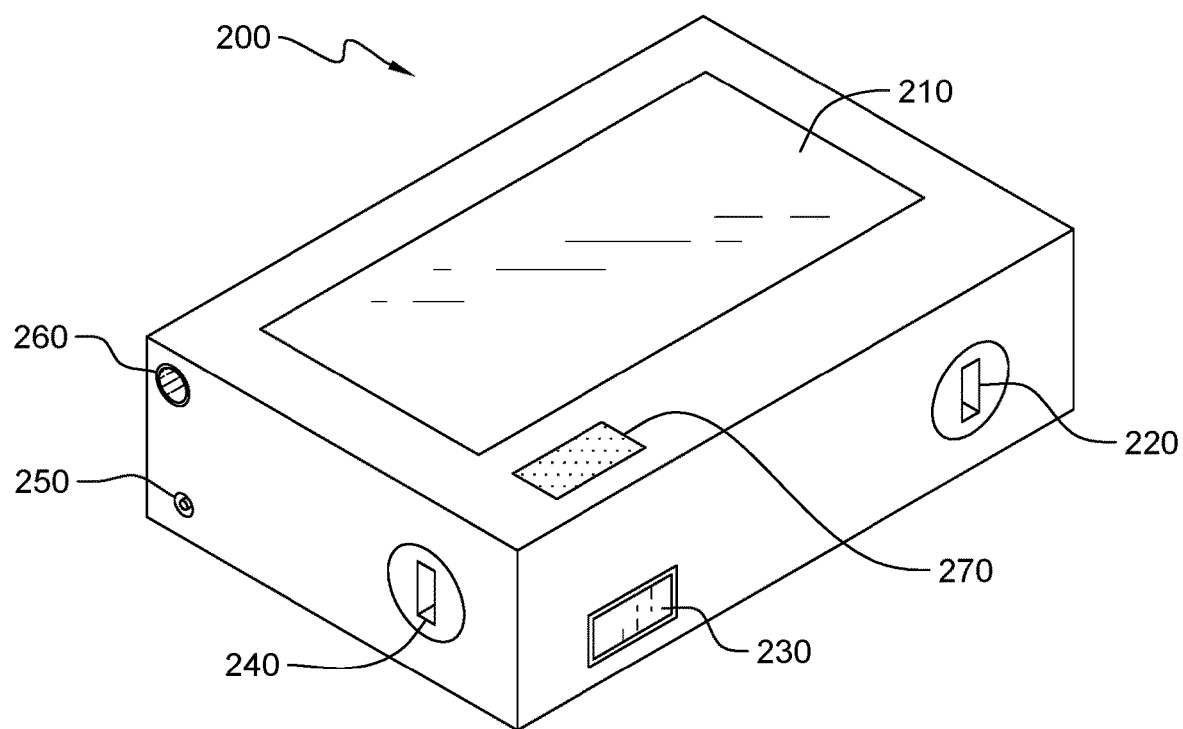
FIG. 2A depicts a perspective view of a block diagram of components of a Certificate Authority (CA) management device, in accordance with an embodiment of the present invention.

FIG. 2A depicts a block diagram of components of a Certificate Authority (CA) management device, in accordance with an embodiment of the present invention. FIG. 2A provides only an illustration of one embodiment and does not imply any limitations with regard to environments in which different embodiments may be implemented. In the depicted embodiment, CA management device 200 includes touch screen 210, key management slot 220, USB port 230, authorized user key slot 240, power port 250, external lock cable portal 260, biometric input scanner 270, and internal computing device 280. In an embodiment, CA management device 200 is enabled via authorized user key slot 220 when an authorized user inserts a hybrid security key, such as hybrid security key 100, and initiates CA management device 200. Once CA management device 200 has been activated and AAA has been completed on inserted hybrid security key, the hybrid security key may be placed in multiple detent positions to enable specific circuitry within CA management device 200 to complete specific management functions.

Internal computing device 280 operates as the internal, self-contained computer for CA management device 200. In some embodiments, internal computing device 280 is a laptop computer, tablet computer, netbook computer, personal computer (PC), a desktop computer, a smart phone, or any programmable electronic device or computing system with embedded operating system (OS) that supports CA software. At time of manufacture, internal computing device 280 is loaded with an ACL of authorized users and associated authorizations. Additionally, at time of manufacture, internal computing device 280 is assigned a permanent UID. In an embodiment, internal computing device 280 is electronically paired with other components of CA management device 200 through each UID. In an embodiment, internal computing device 280 stores the UIDs of each component of CA management device 200 in a UID table (not shown). In an embodiment, the integration of internal computing device 280 in CA management device 200 supports security controls provided by each component of CA management device 200.

CA software embedded on internal computing device 280 supports CA functions, such as cryptographic functions (e.g. Elliptical Curve Cryptography (ECC)). CA software embedded on internal computing device 280 also supports management of distributed security key and lock sets, management of XAdES, and routines for interactions with an authorized user via GUI of touch screen 210. CA software supports management of distributed hybrid security keys and locking devices through use of cryptography public and private key pairs to encrypt and decrypt data payloads between a hybrid security key, locking device, and a CA management device. At time of manufacture, OS of internal computing device 280 is digitally signed with the CA private key. In an embodiment, during OS boot-up, CA private key and UID table are used to confirm validity of each component and prevent tampering with CA management device 200. In an embodiment, CA management device 200 digitally signs data payloads with the CA private key, then locking devices of remote CA devices would use a previously distributed and stored CA public key to validate the data payload.

Touch screen 210 with GUI operates to enable an authorized user to interact with CA management device 200. In an embodiment, touch screen 210 is coupled to a top face of CA management device 200. In an embodiment, touch screen 210 is assigned a UID at time of manufacture, which is stored in UID table. In an embodiment, power to touch screen 210 is enabled once an inserted hybrid security key in authorized user key slot 240 has been authenticated and validated by CA software of internal computing device 280 for authorization to perform GUI operations.

Key management slot 220 operates to enable management of dependent hybrid security keys and user AAA operations through swappable multi-faceted key slots. In an embodiment, key management slot 220 is coupled to a side face of CA management device 200. In several embodiments, key management slot 220 includes locking device 300, as described below in FIGS. 3A-3J. In an embodiment, key management slot 220 is assigned a UID at time of manufacture, which is stored in UID table. In an embodiment, key management slot 220 supports validation of hybrid security key authentication. In an embodiment, key management slot 220 allows an authorized user who has enabled CA management device 200 through a hybrid security key inserted into authorized user key slot 240 to program another hybrid security key inserted into key management slot 220.

USB port 230 operates with a shutter door to enable a USB connection. In an embodiment, USB port 230 is coupled to a side face of CA management device 200. In an embodiment, the shutter door of USB port 230 has a default position of closed. In an embodiment, operation of the shutter door of USB port 230 is controlled by the CA software depending on an authorization or role of a user.

Authorized user key slot 240 operates to allow an authorized user to enable use of CA management device 200. In an embodiment, authorized user key slot 240 is coupled to a side face of CA management device 200. In several embodiments, authorized user key slot 240 includes locking device 300, as described below in FIGS. 3A-3J. In an embodiment, at time of manufacture, authorized user key slot 240 is assigned a UID, which is stored in UID table. In an embodiment, upon insertion of an authorized user's hybrid security key, authorized user key slot 220 supports multiple detent positions that enable specific circuitry within CA management device 200 to complete specific management functions. For example, authorized user key slot 220 with hybrid security key 100 inserted and rotated to a first detent position allows the opening of power port 250's shutter door.

Power port 250 operates with a shutter door to enable external power supply connection. In an embodiment, power port 250 is coupled to a side face of CA management device 200. In an embodiment, the shutter door of power port 250 is opened upon successful insertion of a hybrid security key into authorized user key slot 240 and rotation to first detent position. In an embodiment, power port 250 with open shutter door allows access to power port for connection with external power supply. In an embodiment, the shutter door of power port 250 is closed upon removal of the hybrid security key from authorized user key slot 240.

External lock cable portal 260 operates to enable attachment of an industry standard locking cable to physically secure CA management device 200 in place. In an embodiment, external lock cable portal 260 is coupled to a side face of CA management device 200.

Biometric input scanner 270 operates to allow retinal scanning, fingerprint, and/or facial scanning capabilities. In an embodiment, biometric input scanner 270 is coupled to a top face of CA management device 200 adjacent to touch screen 210. In an embodiment, biometric input scanner 270 is issued a UID at time of manufacture, which is stored in UID table. In an embodiment, biometric input scanner 270 includes a retinal scanner. In another embodiment, biometric input scanner 270 includes a fingerprint scanner. In another embodiment, biometric input scanner 270 includes a facial scanner. In yet another embodiment, biometric input scanner 270 includes a retinal scanner, a fingerprint scanner, and/or a facial scanner.

Figure 2B:
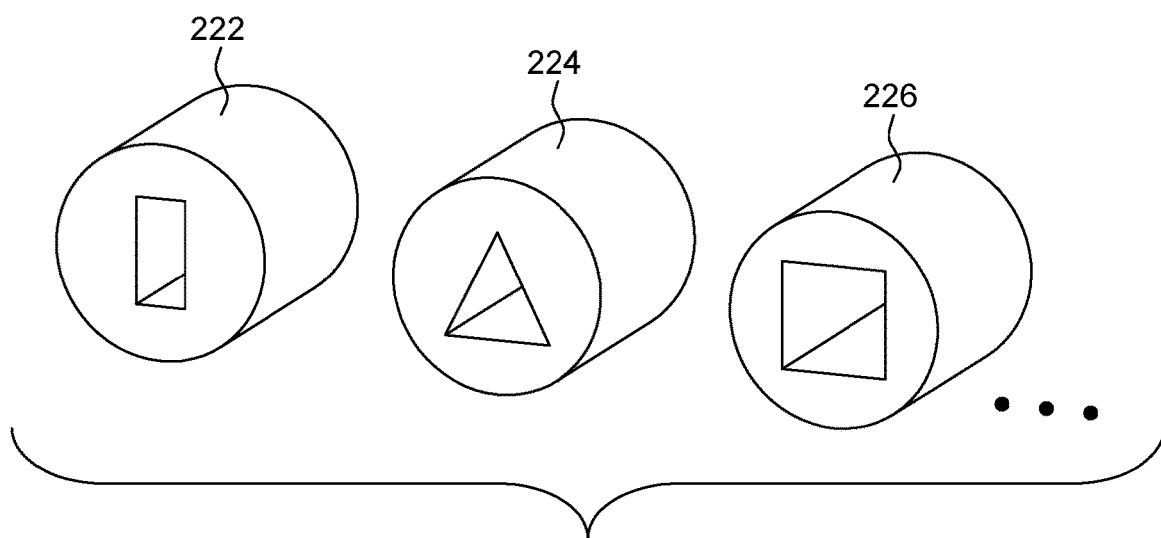
FIG. 2B depicts perspective views of swappable key slots for the key management slot component of FIG. 2A, in accordance with an embodiment of the present invention.

FIG. 2B depicts swappable key slots for the key management slot of FIG. 2A, in accordance with an embodiment of the present invention. FIG. 2B provides only an illustration of one embodiment and does not imply any limitations with regard to environments in which different embodiments may be implemented. In the depicted embodiment, rectangular key slot 222, triangular key slot 224, and square key slot 226 for user key slot 220 are shown. In an embodiment, rectangular key slot 222, triangular key slot 224, and square key slot 226 are interchangeable in key management slot 220 depending on a hybrid security key used. Differing keys slots allowing for hybrid security keys with differing number of facets may be used to differentiate between roles of multiple authorized users and require different key operations.

Figure 2C:
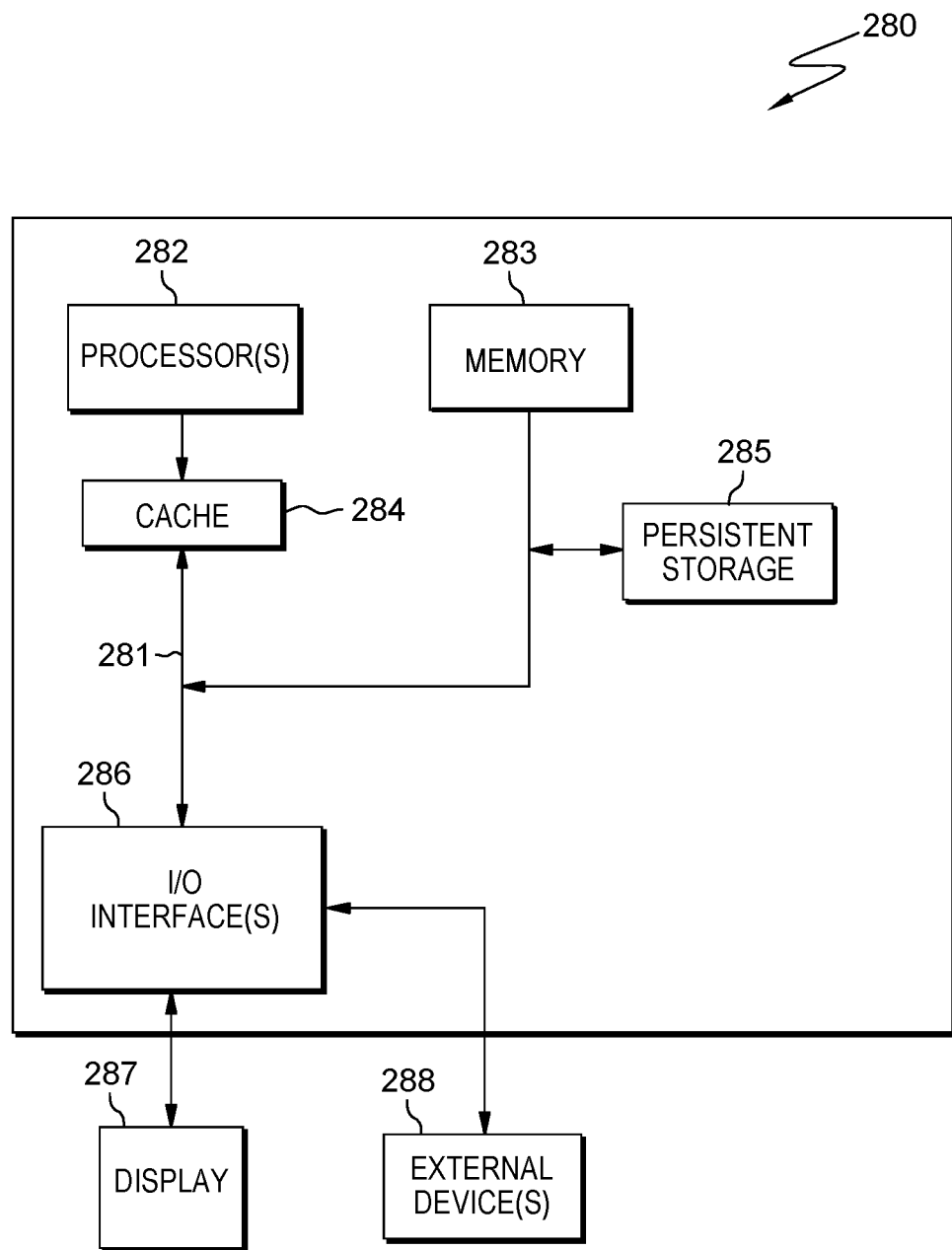
FIG. 2C depicts a block diagram of components of an internal computing device suitable for CA management device, in accordance with an embodiment of the present invention.

FIG. 2C is a block diagram depicting components of internal computing device 280 suitable for CA management device 200, in accordance with an embodiment of the present invention. FIG. 2C displays internal computing device 280, one or more processor(s) 282 (including one or more computer processors), communications fabric 281, memory 283, cache 284, persistent storage 285, I/O interfaces 286, display 287, and external devices 288. It should be appreciated that FIG. 2C provides only an illustration of one embodiment and does not imply any limitations with regard to the environments in which different embodiments may be implemented. Many modifications to the depicted environment may be made.

As depicted, internal computing device 280 operates over communications fabric 281, which provides communications between cache 284, computer processor(s) 282, memory 283, persistent storage 285, and input/output (I/O) interface(s) 286. Communications fabric 281 may be implemented with any architecture suitable for passing data and/or control information between processors 282 (e.g. microprocessors, communications processors, and network processors, etc.), memory 283, external devices 288, and any other hardware components within a system. For example, communications fabric 281 may be implemented with one or more buses or a crossbar switch.

Memory 283 and persistent storage 285 are computer readable storage media. In the depicted embodiment, memory 283 includes a random access memory (RAM). In general, memory 283 may include any suitable volatile or non-volatile implementations of one or more computer readable storage media. Cache 284 is a fast memory that enhances the performance of computer processor(s) 282 by holding recently accessed data, and data near accessed data, from memory 283.

Program instructions for any computer programs may be stored in persistent storage 285 or in memory 283, or more generally, any computer readable storage media, for execution by one or more of respective computer processors 282 via cache 284. Persistent storage 285 may include a magnetic hard disk drive. Alternatively, or in addition to a magnetic hard disk drive, persistent storage 285 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by persistent storage 285 may also be removable. For example, a removable hard drive may be used for persistent storage 285. Other examples include optical and magnetic disks, thumb drives, and smart cards that are inserted into a drive, such as via USB shutter door 230, for transfer onto another computer readable storage medium that is also part of persistent storage 285.

I/O interface(s) 286 allows for input and output of data with other devices that may operate in conjunction with internal computing device 280. For example, I/O interface 286 may provide a connection to external devices 288, which may include a keyboard, keypad, a touch screen, and/or some other suitable input devices, such as touch screen 210 as depicted in FIG. 2A. External devices 288 may also include portable computer readable storage media, for example, thumb drives, such as USB port 230. Software and data used to practice embodiments of the present invention may be stored on such portable computer readable storage media and may be loaded onto persistent storage 285 via I/O interface(s) 286. I/O interface(s) 286 may similarly connect to display 287, such as touch screen 210 as depicted in FIG. 2A. Display 287 provides a mechanism to display data to a user and may be, for example, a computer monitor or touch screen 210.

Figure 3A:
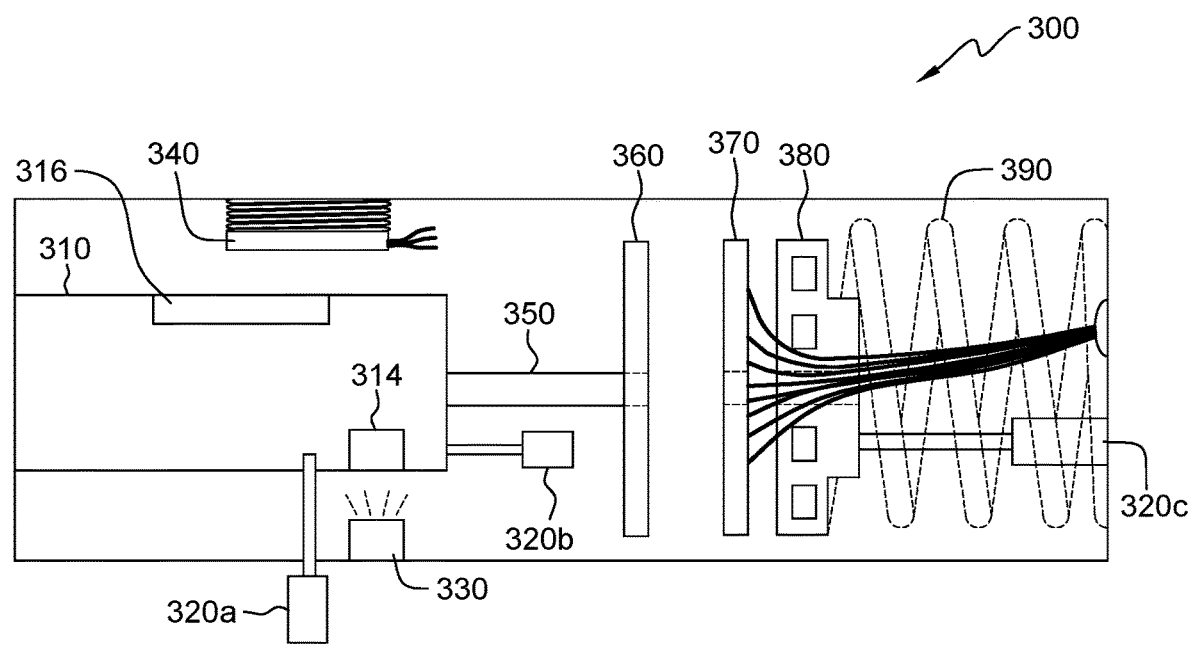
FIG. 3A depicts a top view of a locking device, in accordance with an embodiment of the present invention.

FIG. 3A depicts a top view of a locking device, in accordance with an embodiment of the present invention. FIG. 3A provides only an illustration of one embodiment and does not imply any limitations with regard to environments in which different embodiments may be implemented.

In several embodiments, locking device 300 can be a part of key management slot 220 and/or authorized user key slot 240. In the depicted embodiment, locking device 300 contains lock cylinder 310, solenoid valve 320*a*, solenoid valve 320*b*, and solenoid valve 320*c*, barcode scanner 330, spring-loaded interface 340, shaft 350, switch configuration disc 360, switch interface disc 370, spacer 380, and spring 390.

In an embodiment, lock cylinder 310 is a cylinder with a key slot on an exposed front face (see FIGS. 3H-J) that is flush with end of locking device 300. In an embodiment, solenoid valve 320*a* is coupled to an interior wall of locking device 300 and located between the interior wall of locking device 300 and lock cylinder 310. In an embodiment, when engaged, solenoid valve 320*a* extends into lock cylinder 310 to prevent rotation of the lock cylinder 310 and/or removal of an inserted hybrid security key 100. In an embodiment, solenoid valve 320*b* is located in between lock cylinder 310 and switch configuration disc 360. In an embodiment, when engaged, solenoid valve 320*b* extends to prevent lock cylinder 310 from moving along the central axis of locking device 300. In an embodiment, solenoid valve 320*c* is coupled to a rear interior wall of locking device 300 and located between spacer 380 and the rear wall of locking device 300 with spring 390 spiraling around solenoid valve 320*c*. In an embodiment, solenoid valve 320*c* operates as a failsafe circuit breaker when an AAA failure occurs. In an embodiment, solenoid valves 320*a*, 320*b*, and 320*c* are controlled by circuitry of locking device 300 (not shown).

In an embodiment, barcode scanner 330 is coupled to an interior wall of locking device 300 and located between the interior wall of locking device 300 and lock cylinder 310. In an embodiment barcode scanner 330 operates to scan a barcode of an inserted hybrid security key in lock cylinder 310.

In an embodiment, spring-loaded interface 340 is coupled to an interior wall of locking device 300 and located between the interior wall of locking device 300 and lock cylinder 310. In an embodiment, spring-loaded interface 340 operates as a logical interface that, when applicable, is engaged against a logical side of an inserted hybrid security key, such as logical side 120 of hybrid security key 100 to complete a circuit and read information stored on the hybrid security key, such as digital attributes of the hybrid security key, credentials, and/or a data payload digitally signed with the CA private key.

In an embodiment, shaft 350 is coupled to a rear exterior face of lock cylinder 310 on one end and can be moved through switch configuration disc 360, switch interface disc 370, and spacer 380. In an embodiment, switch configuration disc 360 is a disc (see FIGS. 3C-D) located between lock cylinder 310 and switch interface disc 370. In an embodiment, switch configuration disc 360 operates to make and break physical circuit connections when in physical contact with switch interface disc 370 (see FIG. 3B). In an embodiment, switch interface disc 370 is a disc (see FIGS. 3E-F) located between switch configuration disc 360 and spacer 380. In an embodiment, switch interface disc 370 operates to make and break physical circuit connections when in physical contact with switch configuration disc 360 (see FIG. 3B). In an embodiment, spacer 380 is a disc (see FIG. 3G) with spring 390 coupled to a rear face of spacer 380 that is located between switch interface disc 370 and a rear interior wall of locking device 300. In an embodiment, spring 390 is a spring coupled to a rear face of spacer 380 on one end and a rear interior wall of locking device 300 on a second end.

Figure 3B:
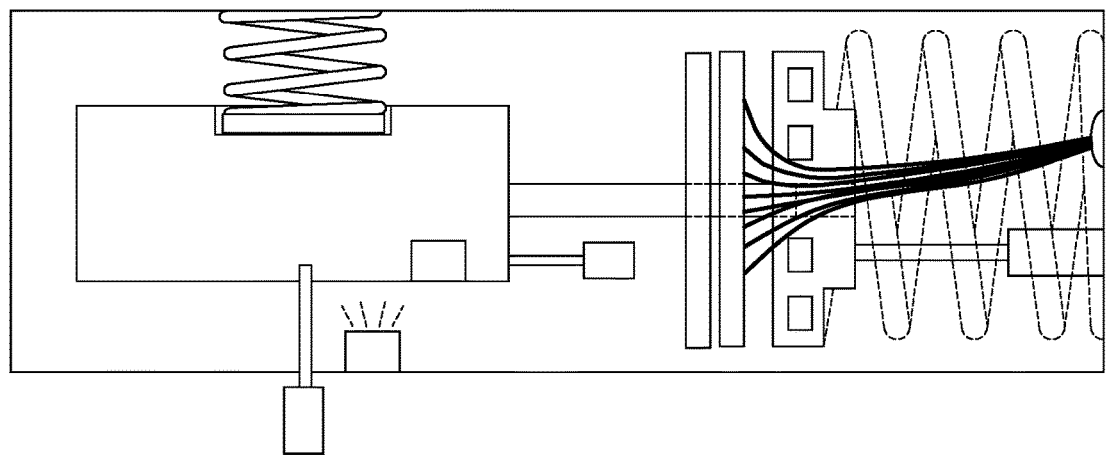
FIG. 3B depicts a top view of a locking device after key authentication has occurred, in accordance with an embodiment of the present invention.

FIG. 3B depicts a top view of a locking device after key authentication has occurred, in accordance with an embodiment of the present invention. FIG. 3B provides only an illustration of one embodiment and does not imply any limitations with regard to environments in which different embodiments may be implemented. In the depicted embodiment, lock cylinder 310—with a hybrid security key inserted that has passed a first authentication step, so solenoid valves have been disengaged (see decision 405 through decision 430 of FIG. 4)—has been pushed in along a central axis of locking device 300 to allow shaft 350 to be pushed through switch interface disc 370 and spacer 380, and to allow switch configuration disc 360 to come in contact with and complete a circuit with switch interface disc 370.

Figure 3C:
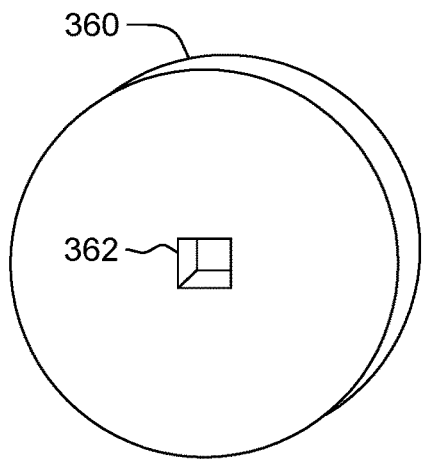
FIG. 3C depicts a front side view of a switch configuration disc of the locking device of FIG. 3A, in accordance with an embodiment of the present invention.

FIG. 3C depicts a front side view of a switch configuration disc of the locking device of FIG. 3A, in accordance with an embodiment of the present invention. FIG. 3C provides only an illustration of one embodiment and does not imply any limitations with regard to environments in which different embodiments may be implemented. In the depicted embodiment, a front face of switch configuration disc 360 includes cam shaft 362, which is a hole through a central axis of switch configuration disc 360. In an embodiment, shaft 350 is oriented in cam shaft 362 of switch configuration disc 360.

Figure 3D:
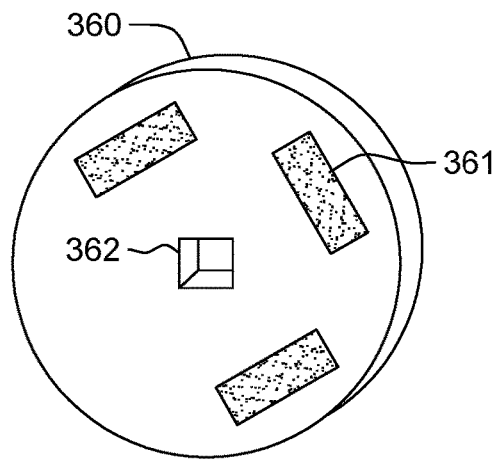
FIG. 3D depicts a rear side view of a switch configuration disc of the locking device of FIG. 3A, in accordance with an embodiment of the present invention.

FIG. 3D depicts a rear side view of a switch configuration disc of the locking device of FIG. 3A, in accordance with an embodiment of the present invention. FIG. 3D provides only an illustration of one embodiment and does not imply any limitations with regard to environments in which different embodiments may be implemented. In the depicted embodiment, a rear face of switch configuration disc 360 contains conductive elements 361 and cam shaft 362. In an embodiment, conductive elements 361 are pieces of conductive material oriented around the rear face of switch configuration disc 360. In multiple embodiments, conductive elements 361 can take different shapes and be oriented around switch configuration disc 360 depending on circuitry.

Figure 3E:
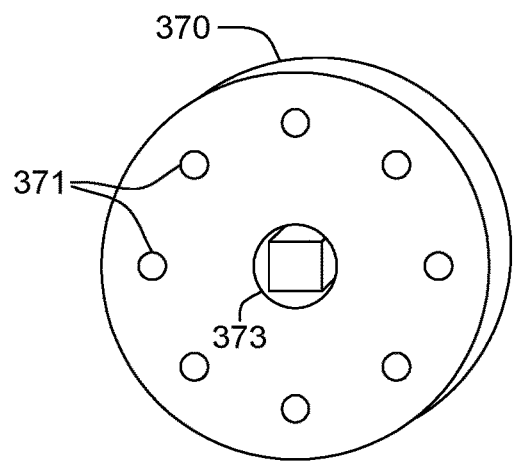
FIG. 3E depicts a front side view of a switch interface disc of the locking device of FIG. 3A, in accordance with an embodiment of the present invention.

FIG. 3E depicts a front side view of a switch interface disc of the locking device of FIG. 3A, in accordance with an embodiment of the present invention. FIG. 3E provides only an illustration of one embodiment and does not imply any limitations with regard to environments in which different embodiments may be implemented. In the depicted embodiment, front face of switch interface disc 370 contains contact points 371 and hole 373. In an embodiment, contact points 371 are made of conductive material to complete a circuit with conductive elements 361 of switch configuration disc 360. In the depicted embodiment, switch interface disc 370 includes eight circular-shaped contact points that are arranged around hole 373 in a circular shape. In other embodiments, switch interface disc 370 includes a differing number and arrangement of contact points depending on circuitry. In an embodiment in which shaft 350 is oriented through hole 317 (see FIG. 3B), the shape of hole 317 prevents switch interface disc 370 from being rotated.

Figure 3F:
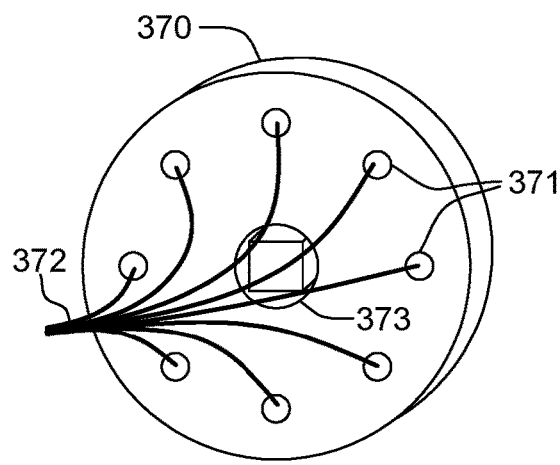
FIG. 3F depicts a rear side view of a switch interface disc of the locking device of FIG. 3A, in accordance with an embodiment of the present invention.

FIG. 3F depicts a rear side view of a switch interface disc of the locking device of FIG. 3A, in accordance with an embodiment of the present invention. FIG. 3F provides only an illustration of one embodiment and does not imply any limitations with regard to environments in which different embodiments may be implemented. In the depicted embodiment, rear face of switch interface disc 370 contains contact points 371, wiring 372, and hole 373. In an embodiment, a wire of wiring 372 is coupled to each contact point 371 on switch interface disc 370. In the depicted embodiment, wiring 372 includes eight wires that are individually coupled to each contact point 371. In other embodiments, switch interface disc 370 includes differing number of wires depending on how many contact points are included.

Figure 3G:
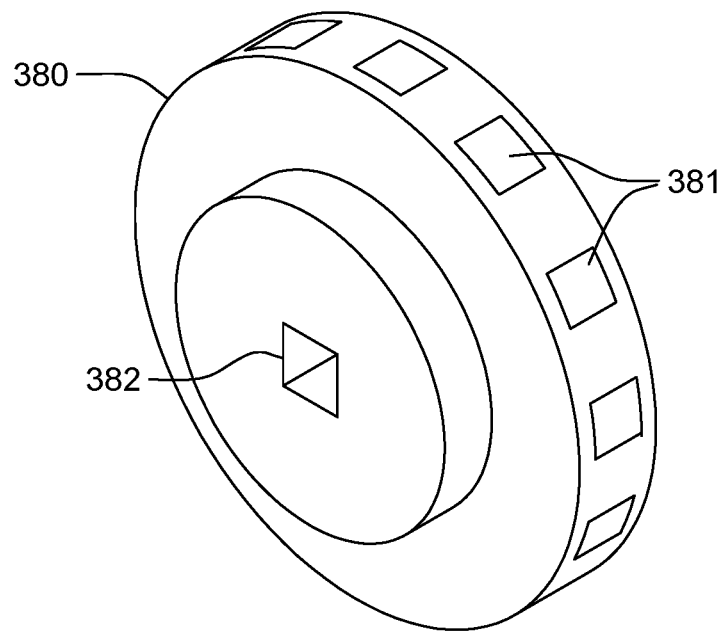
FIG. 3G depicts a perspective view of a spacer of the locking device of FIG. 3A, in accordance with an embodiment of the present invention.

FIG. 3G depicts a perspective view of a spacer of the locking device of FIG. 3A, in accordance with an embodiment of the present invention. FIG. 3G provides only an illustration of one embodiment and does not imply any limitations with regard to environments in which different embodiments may be implemented. In the depicted embodiment, spacer 380 contains pin sockets 381 and cam shaft 382. In an embodiment, pin sockets 381 are arranged around the perimeter of spacer 380. Pin sockets 381 operate to allow pins or solenoid valves to be engaged in pin sockets 381 to prevent spacer 380 and switch configuration disc 360 connected through shaft 350 from being rotated.

Figure 3H:
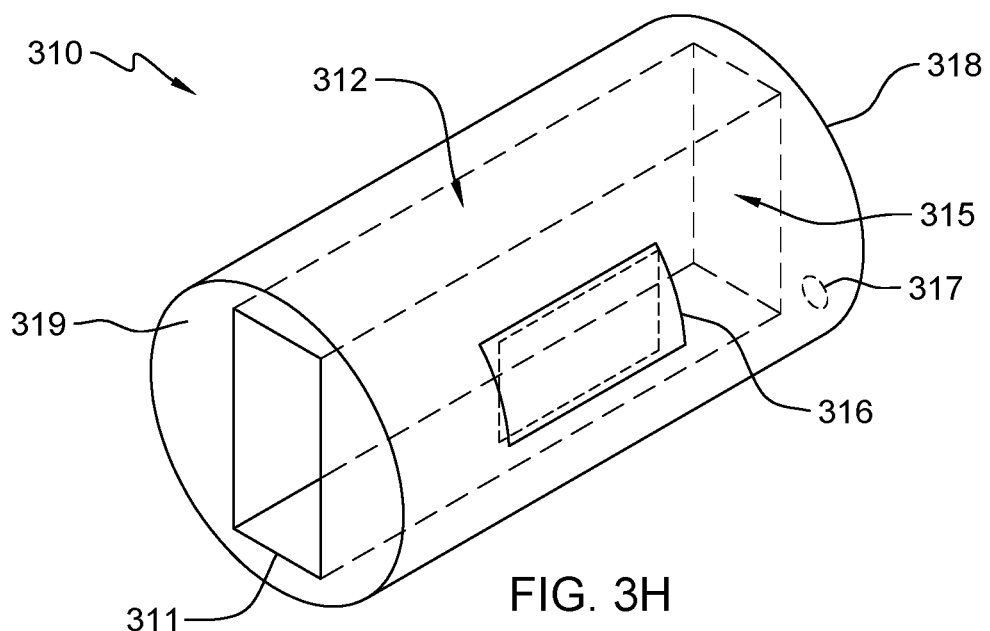
FIG. 3H depicts a perspective view of a lock cylinder of the locking device of FIG. 3A, in accordance with an embodiment of the present invention.

FIG. 3H depicts a perspective view of a lock cylinder of the locking device of FIG. 3A, in accordance with an embodiment of the present invention. FIG. 3H provides only an illustration of one embodiment and does not imply any limitations with regard to environments in which different embodiments may be implemented. In the depicted embodiment, lock cylinder 310 includes front face 319 with rectangular slot 311, which is an internal cut out through the central axis of lock cylinder 310, and back face 318 with hole 317, which is a hole into rear face 318 for solenoid valve 320b.

Figure 3I:
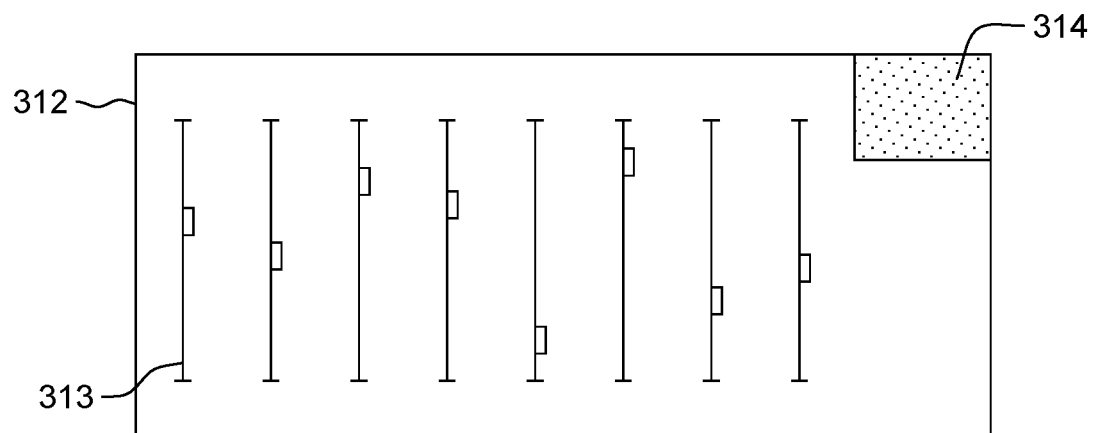
FIG. 3I depicts a side view of a first interior wall of lock cylinder of the locking device of FIG. 3A, in accordance with an embodiment of the present invention.

FIG. 3I depicts a side view of an interior wall of lock cylinder of the locking device of FIG. 3A that corresponds with a face of a hybrid security key with physical aspects, such as physical side 110 of hybrid security key 100, in accordance with an embodiment of the present invention. FIG. 3I provides only an illustration of one embodiment and does not imply any limitations with regard to environments in which different embodiments may be implemented. In the depicted embodiment, interior wall 312 of lock cylinder 310 contains locking pins 312 and opening 314. In an embodiment, eight locking pins are coupled to an exposed face of interior wall 312. Other embodiments may contain a differing number of locking pins. In an embodiment, locking pins 313 are moveable up and down along a straight line track and project out from the exposed face of the interior wall. In an embodiment, opening 314 is a cutout or opening through the lock cylinder to allow the barcode scanner of the locking device to scan the barcode on a physical side of a hybrid security key. For example, opening 314 is a cut through lock cylinder 310 to allow barcode scanner 330 to scan authentication code 112 on physical side 110 of hybrid security key 100.

Figure 3J:
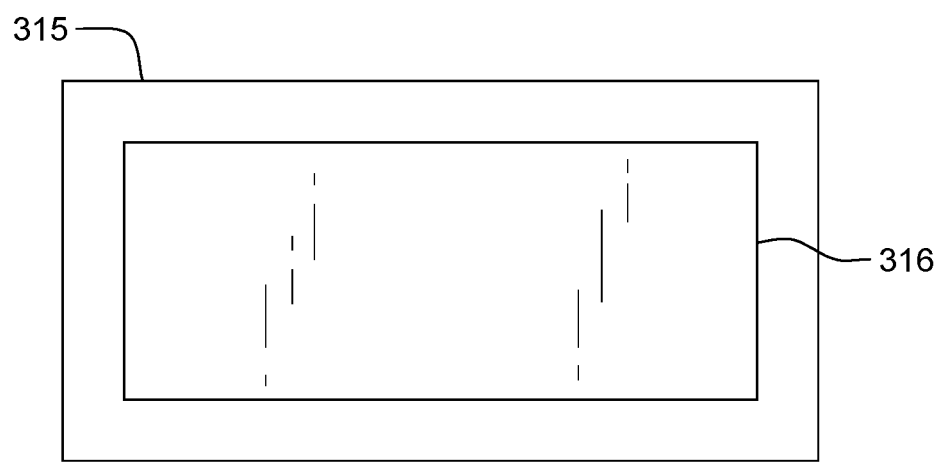
FIG. 3J depicts a side view of a second interior wall of lock cylinder of the locking device of FIG. 3A, in accordance with an embodiment of the present invention.

FIG. 3J depicts a side view of an interior wall of lock cylinder of the locking device of FIG. 3A that corresponds with a face of a hybrid security key with logical aspects, such as logical side 120 of hybrid security key 100, in accordance with an embodiment of the present invention. FIG. 3J provides only an illustration of one embodiment and does not imply any limitations with regard to environments in which different embodiments may be implemented. In the depicted embodiment, interior wall 315 contains interface door 316. In an embodiment, interface door 316 is a moveable door on a track that when a track key pin is engaged, interface door 316 is rotated open along the track within the lock cylinder (not shown).

Figure 4:
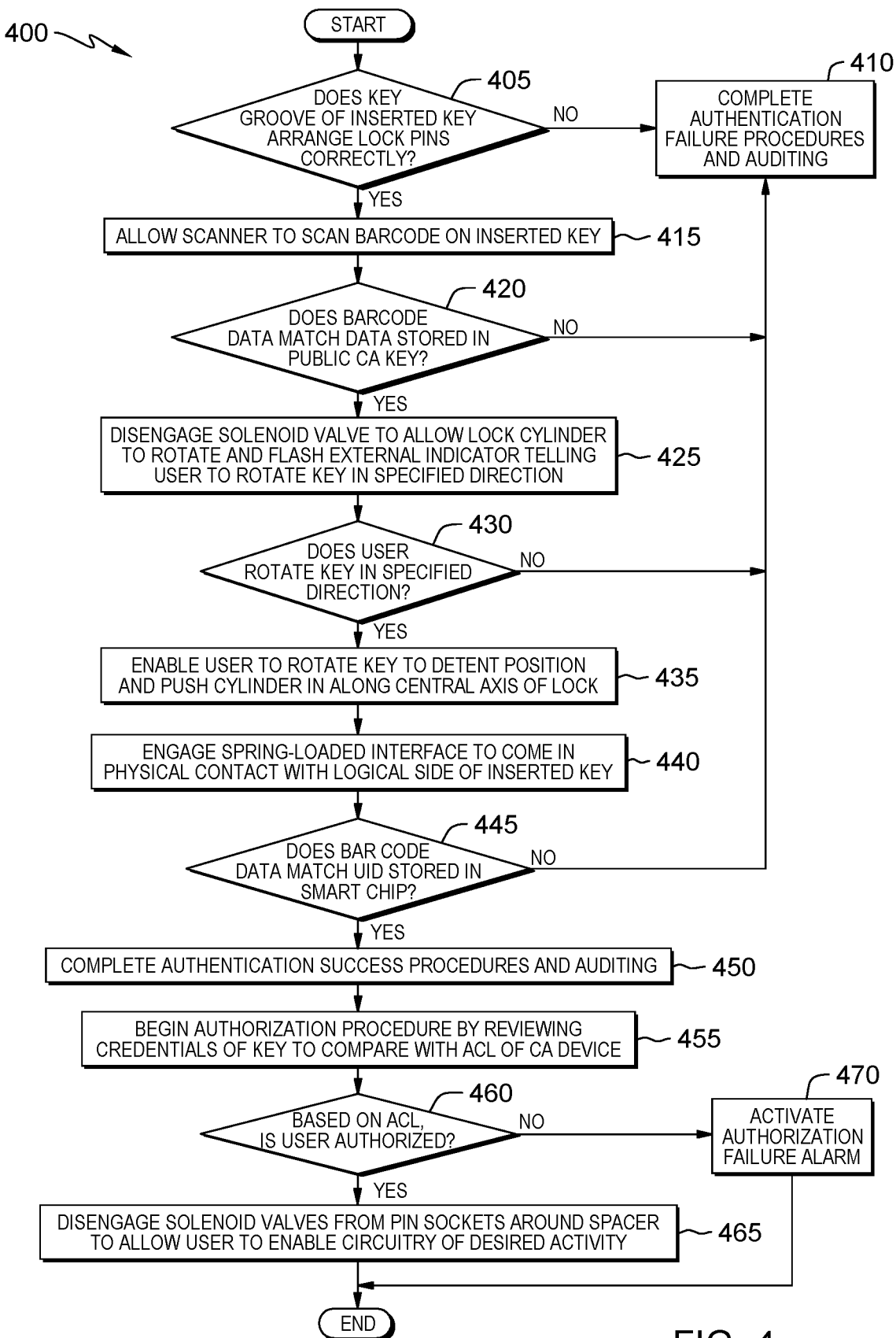
FIG. 4 depicts a flowchart depicting operational steps of a lock mechanism executing within the locking device of FIGS. 3A-3B, in accordance with an embodiment of the present invention.

FIG. 4 depicts a flowchart depicting operational steps of a lock mechanism executing within locking device 300 of FIGS. 3A-3B, in accordance with an embodiment of the present invention. In the depicted embodiment, lock mechanism 400 operates to complete AAA on a hybrid security key inserted into a locking device of a CA management device.

It should be appreciated that the process depicted in FIG. 4 illustrates one possible iteration of lock mechanism, which repeats for each time a hybrid security key, such as hybrid security key 100, is inserted into a locking device, such as locking device 300, of a CA device, such as CA management device 200.

In decision 405, once a hybrid security key has been inserted into a locking device of a CA device, locking mechanism 400 determines whether a key groove cut of the hybrid security key arranges locking pins in a lock cylinder of locking device in correct arrangement to enable rotation of lock cylinder. For example, once hybrid security key 100 has been inserted into authorized user key slot 240 of CA management device 200, locking mechanism 400 determines whether key groove cut 116 on physical side 110 of hybrid security key 100 arranges locking pins 313 of interior wall 312 of lock cylinder 310 in correct arrangement to enable rotation of lock cylinder. If, in decision 405, key groove cut 116 does arrange locking pins 313 in correct arrangement to enable rotation of lock cylinder, then locking mechanism 400 moves to step 415. If, in decision 405, key groove cut 116 does not arrange locking pins 313 in correct arrangement to enable rotation of lock cylinder, then locking mechanism 400 moves to step 410, in which authentication failure procedures occur.

In step 410, because an authentication failure has occurred, locking mechanism 400 engages a solenoid value to prevent the removal of a hybrid security key for a predetermined length of time to allow for auditing to occur. For example, locking mechanism 400 engages solenoid values 320 to prevent the removal of hybrid security key 100 for a predetermined length of time to allow for auditing to occur. In an embodiment, locking mechanism 400 completes auditing by extracting the credentials of the inserted hybrid security key (e.g., hybrid security key 100. In an embodiment, in step 410, locking mechanism 400 sets off an authentication failure alarm. In embodiments where applicable, locking mechanism 400 disengages spring-loaded interface 340 and closes interface door 116. In embodiments where applicable, locking mechanism 400 engages solenoid valve 320b behind lock cylinder 110 to push cylinder back to position in FIG. 3A and engages solenoid valve 320a back into lock cylinder to prevent rotation and removal of hybrid security key 100.

In step 415, locking mechanism 400 allows a barcode scanner to scan a barcode of the inserted hybrid security key. For example, locking mechanism 400 allows barcode scanner 330 to scan authentication code 112 on physical side 110 of hybrid security key 100. In an embodiment, locking mechanism 400 uses a public CA key stored in the locking device to validate digital representation of key groove cut digitally signed with CA private key. For example, locking mechanism 400 uses public CA key stored in locking device 300.

In decision 420, locking mechanism 400 determines whether the digital representation of the key groove cut stored in the barcode matches the digital representation stored in the locking device using the public CA key. For example, locking mechanism 400 determines whether the digital representation of key groove cut 116 stored in authentication code 112 matches the digital representation stored in locking device 300 using the public CA key. If, in decision 420, locking mechanism 400 determines that the digital representation of key groove cut 116 stored in authentication code 112 matches the digital representation stored in the locking device using the public CA key, then locking mechanism 400 moves to step 425. If, in decision 420, locking mechanism 400 determines that the digital representation of key groove cut 116 stored in authentication code 112 does not match the digital representation stored in the locking device using the public CA key, then locking mechanism 400 moves to step 410, in which authentication failure procedures occur.

In step 425, locking mechanism 400 disengages a solenoid valve extended into the lock cylinder and flashes an external indicator on the locking device indicating to a user who inserted the hybrid security key to rotate the hybrid security key in a specified direction (e.g. left or right). For example, locking mechanism 400 disengages solenoid valve 320a extended into lock cylinder 310 (see FIG. 3A) and flashes external indicator on locking device 300 (not shown) indicating to a user who inserted hybrid security key 100 to rotate hybrid security key 100 in a specified direction (e.g. left or right). For example, locking mechanism 400 flashes an arrow pointing to the left or to the right.

In decision 430, locking mechanism 400 determines whether the user rotated a hybrid security key (e.g. hybrid security key 100) in the specified direction. If, in decision 430, the user rotated hybrid security key 100 in the specified direction, then locking mechanism 400 moves to step 435. If, in decision 430, the user did not rotate hybrid security key 100 in the specified direction, then locking mechanism 400 moves to step 410, in which authentication failure procedures occur.

In step 435, locking mechanism 400 enables the user to rotate the hybrid security key inserted in the lock cylinder to a detent position and push in along the central axis of the locking device. For example, locking mechanism 400 enables the user to rotate hybrid security key 100 inserted in lock cylinder 310 to a detent position and push in along the central axis of locking device 300 (see FIG. 3B). In an embodiment, the detent position correlates with an activity user is proposedly trying to complete using CA management device 200. In an embodiment, as lock cylinder 310 is pushed in, locking mechanism 400 engages track key pin of interface door 316 to rotate interface door 316 open to expose logical side 120 of hybrid security key 100.

In step 440, locking mechanism 400 engages a spring-loaded interface outside of the lock cylinder to come in physical contact with a logical side of the hybrid security key. For example, locking mechanism 400 engages spring-loaded interface 340 to come in physical contact with logical side 120 of hybrid security key 100. In an embodiment, locking mechanism 400 uses public CA key stored in the locking device to validate UID of the hybrid security key stored in its smart chip. For example, locking mechanism 400 uses public CA key stored in locking device 300 to validate UID of hybrid security key 100 stored in smart chip 134.

In decision 445, locking mechanism 400 determines whether the barcode on the physical side of the hybrid security key matches the UID stored in the smart chip on the logical side of the hybrid security key. For example, locking mechanism 400 determines whether authentication code 112 of physical side 110 matches UID stored in smart chip 134 of logical side 120. In an embodiment, locking mechanism 400 uses the CA public key stored in locking device 300 to decrypt authentication code 112 and use the retrieved UID stored in smart chip 134 to validate both the physical and logical attributes on hybrid security key 100 as being authentic. If, in decision 445, locking mechanism 400 determines that authentication code 112 matches UID stored in smart chip 134 of logical side 120, then locking mechanism moves to step 450, in which authentication success procedures occur. If, in decision 445, locking mechanism 400 determines that authentication code 112 does not match UID stored in smart chip 134 of logical side 120, then locking mechanism moves to step 410, in which authentication failure procedures occur.

In step 450, locking mechanism 400 completes authentication success procedures and auditing procedures. In an embodiment, locking mechanism 400 completes auditing by extracting the credentials of hybrid security key 100, digitally signing a data payload (e.g., an ACL for distribution, a firmware update, logging data, etc.) with private key of CA management device 200, and writing signed data payload to secure logging storage of locking device 300 and to secure logging storage of hybrid security key 100. In an embodiment, once auditing is completed, locking mechanism moves onto authorization steps.

In step 455, locking mechanism 400 begins authorization procedures by reviewing the extracted credentials from the hybrid security key to compare with an ACL stored on an internal computing device of the CA device to see what the user with that hybrid security key is authorized to do on the CA device. For example, locking mechanism 400 reviews the extracted credentials from hybrid security key 100 to compare with ACL stored on internal computing device 280 of CA management device 200 to see what the user with hybrid security key 100 is authorized to do on CA management device 200.

In decision 460, locking mechanism 400 determines whether, based on ACL, user is authorized. If, in decision 460, locking mechanism 400 determines that, based on ACL, user is authorized, then locking mechanism 400 moves to step 465. If, in decision 460, locking mechanism 400 determines that, based on ACL, user is not authorized, then locking mechanism 400 moves to step 470, in which authorization alarm is activated.

In step 465, locking mechanism 400 disengages pins or solenoid valves (not shown) from pin sockets 381 around perimeter of spacer 380. In an embodiment, once solenoid valves are disengaged, spacer 380 and switch configuration disc 360—which are connected by cam shafts along shaft 350—can be rotated to complete circuitry between switch configuration disc 360 and switch interface disc 370 to enable a certain activity and its associated circuitry to be completed on CA management device 200. In an embodiment, decision 445 through decision 460 are repeated after a predetermined length of time to revalidate the authorization of the user.

Aspects of the present invention are described herein with reference to flowchart illustrations and/or block diagrams of apparatuses (systems) and methods according to embodiments of the invention. It will be understood that each block of the flowchart illustrations and/or block diagrams, and combinations of blocks in the flowchart illustrations and/or block diagrams, can be implemented by the apparatuses described above.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A hybrid security key comprising:
   at least one physical face on a first side of a key comprising a key groove cut and a barcode coupled to a top surface of the physical face, wherein the barcode is a machine-readable representation of (i) a key manufacturer's certificate authority signing a digital representation of the key groove cut and (ii) a unique identification of the smart chip; and
   at least one logical face on a second side of the key comprising a surface insert overlaying a conductive film, wherein the conductive film includes at least one contact point, at least one conductive trace, and a smart chip.

2. The hybrid security key of claim 1, wherein the smart chip stores a log of a use of the hybrid security key for auditing.

3. The hybrid security key of claim 1, wherein the smart chip stores (i) credentials for authentication of the hybrid security key and (ii) a unique identification (UID).

4. The hybrid security key of claim 1, wherein the conductive trace electrically connects the at least one contact point to the smart chip.

5. The hybrid security key of claim 1, wherein the barcode is a quick response code.

6. The hybrid security key of claim 1, wherein the at least one logical face contains tamper resistant electronic components.

7. The hybrid security key of claim 1, wherein the hybrid security key supports:
   secured data distribution with a non-networked device;
   secure remote multi-factor authentication and authorization; and
   logging of the hybrid security key's usage for auditing.

* * * * *